United States Patent [19]

Chang et al.

[11] Patent Number: 5,303,738
[45] Date of Patent: Apr. 19, 1994

[54] CONTROL VALVE

[75] Inventors: Wu-Ming Chang, No. 30, Alley 1, Lane 100, Ta-Ya Rd., Taichung City; Hsueh-Sheng Liu, Tainan, both of Taiwan

[73] Assignee: Wu-Ming Chang, Taichung, Taiwan

[21] Appl. No.: 51,154

[22] Filed: Apr. 21, 1993

[51] Int. Cl.⁵ .............................................. F61K 15/14
[52] U.S. Cl. .................. 137/852; 73/861.53; 137/843; 251/902
[58] Field of Search .................. 251/902; 137/512.15, 137/843, 852; 73/861.53

[56] References Cited

U.S. PATENT DOCUMENTS

| | | | |
|---|---|---|---|
| 2,125,435 | 8/1938 | Erling | 137/843 X |
| 2,850,897 | 9/1958 | Main | 73/861.53 |
| 3,063,461 | 11/1962 | Rudolph | 137/852 X |
| 3,403,556 | 10/1968 | Koester | 73/861.53 |
| 3,610,279 | 10/1971 | McIntosh | 251/902 X |
| 4,006,634 | 2/1977 | Billette | 73/861.53 |

Primary Examiner—Robert G. Nilson
Attorney, Agent, or Firm—Christie, Parker & Hale

[57] ABSTRACT

A control valve includes a tubular member and a truncated conical helix spring received in the tubular member. A diverging open end of the helix spring is fixed adjacent to a first open end of the tubular member. The helix spring has a truncated tapered open end opposed to the diverging open end. A plug member is fixed in the truncated tapered open end in order to close the truncated tapered open end. The truncated conical helix spring confines a truncated cone-shaped chamber and is formed of a plurality of turns which are wound in a watertight manner. The helix spring extends and forms a plurality of clearances among the turns under a predetermined axial tension force. The tubular member has two connecting outlet ports which are to be connected respectively to the ends of a transducer in order to measure the differential pressure and thereby measure the flow rate of the fluid which passes through the tubular member.

3 Claims, 6 Drawing Sheets

CONTROL VALVE

BACKGROUND OF THE INVENTION

1. Field of the Invention

This invention relates to a control valve, more particularly to a triple functional valve.

2. Description of the Related Art

Flow control valves, such as check valves, flow regulators and flowmeters are widely used in fluid systems. Check valves are used to restrict the direction of fluid flow. Flow regulators can regulate the flow rate of fluid. In the past, these flow control valves are individually designed, constructed and utilized in a fluid system.

FIGS. 1 and 2 show a conventional check valve and a conventional regulator, respectively. The conventional check valve has two separate housings, 91 and 92, which can be locked to each other in order to form a valve seat, and a plurality of preset devices for controlling the direction of fluid flow, the flow rate, etc., which are mounted individually in the valve seat. The conventional regulator has a construction similar to the conventional check valve and has a valve seat formed of two detachable housings, 93 and 94, and a plurality of preset controlling devices mounted in the valve seat. The structure and the assembly of the conventional check valve and regulator are complicated and troublesome, resulting in a high manufacturing cost.

FIG. 3 shows a variable area flowmeter which has a plug 81 that is movable in a tube member 82 in order to change the pass area of the aperture 83 through which the fluid flows. The tube member 82 has two holes, 84 and 85, which are to be connected to a transducer (not shown) in order to measure the differential pressure which has mathematic relationship with the flow rate in the tube member 82. Such a flowmeter is individually utilized in a fluid system, that is, there is no structural relationship between the flowmeter, the conventional check valve and the regulator in the fluid system. Since the flowmeter, the check valve and the regulator must be mounted separately on the fluid system, the arrangement and assembly of these control valves in the pipeline of the fluid system are time-consuming and troublesome.

SUMMARY OF THE INVENTION

A main objective of this invention is to provide a novel triple functional valve in one which can serve as a check valve, a flow regulator and a flowcell for metering at the same time, as opposed to the conventional setup in which are three different separate devices such as a check valve, a flow regulator and a flowmeter, requiring a prior installation operation for their connection.

Accordingly, the control valve of this invention includes a tubular member, and a truncated conical helix spring received in the tubular member. A diverging open end of the helix spring is fixed adjacent to a first open end of the tubular member. The helix spring has a truncated tapered open end opposed to the diverging open end. A plug member is fixed in the truncated tapered open end in order to close the truncated tapered open end. The helix spring confines a truncated cone-shaped chamber and is formed of a plurality of turns which are wound in a watertight manner. The truncated conical helix spring extends and forms a plurality of clearances among the turns under a predetermined axial tension force.

The tubular member has two connecting outlet ports which are to be connected respectively to the ends of a transducer in order to measure the differential pressure and thereby measure the flow rate of the fluid which passes through the tubular member.

Other features and advantages of this invention will become apparent in the following detailed description of the preferred embodiments of this invention with reference to the accompanying drawings.

DETAILED DESCRIPTION OF THE PREFERRED EMBODIMENTS

Figure 1:
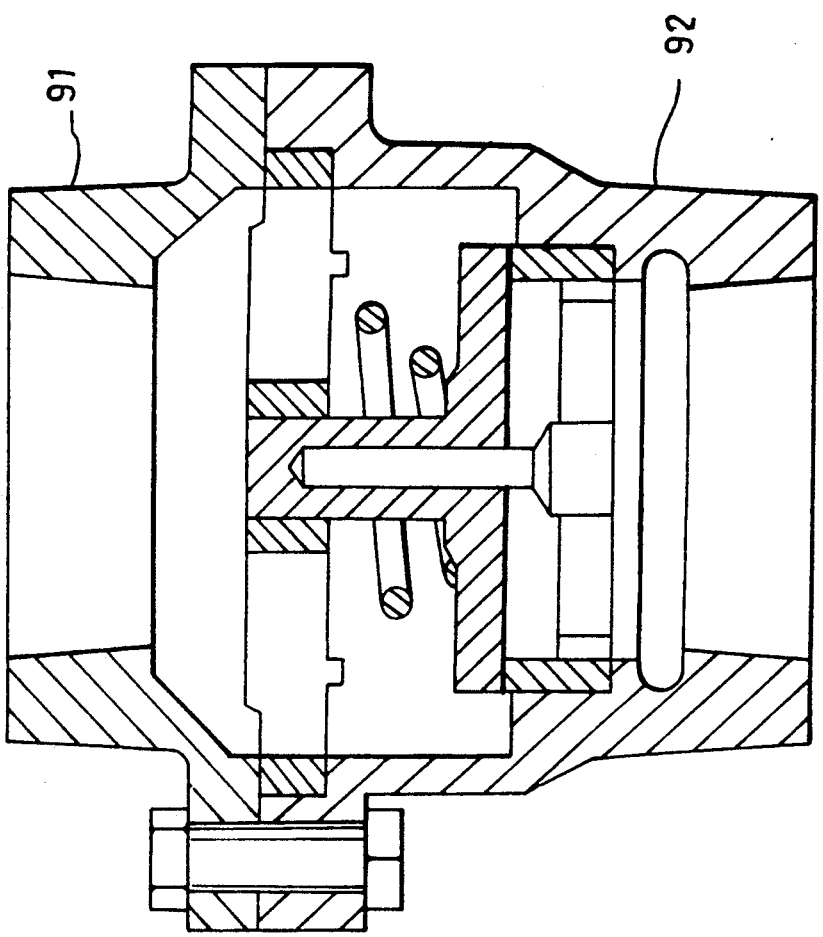
FIG. 1 is a sectional view of a conventional check valve.
Figure 2:
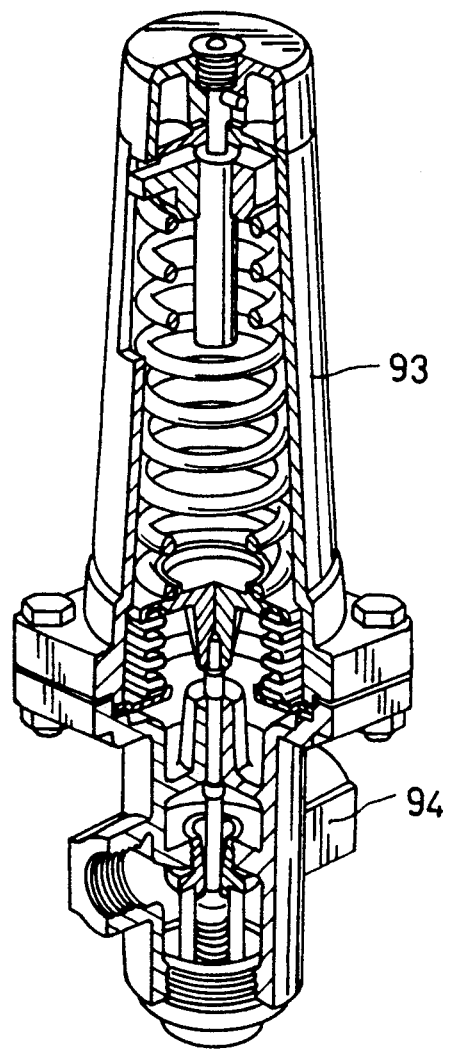
FIG. 2 is a fragmentary perspective view of a conventional regulator.
Figure 3:
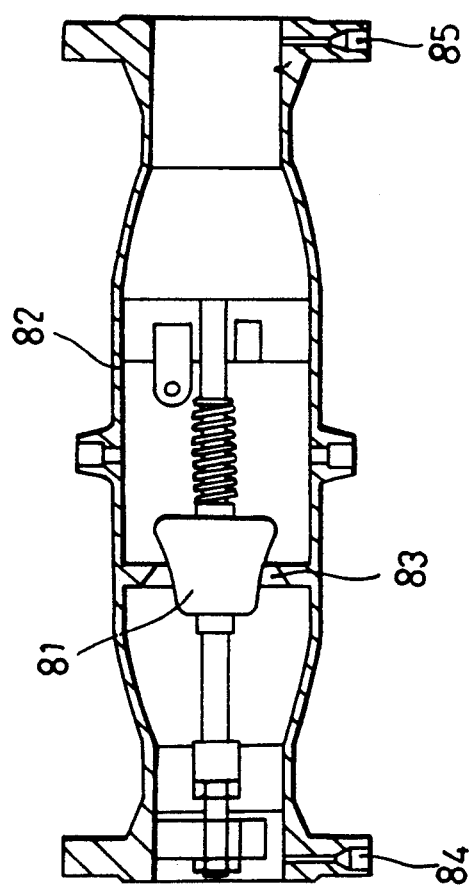
FIG. 3 is a sectional view of a conventional variable area flowmeter.
Figure 4:
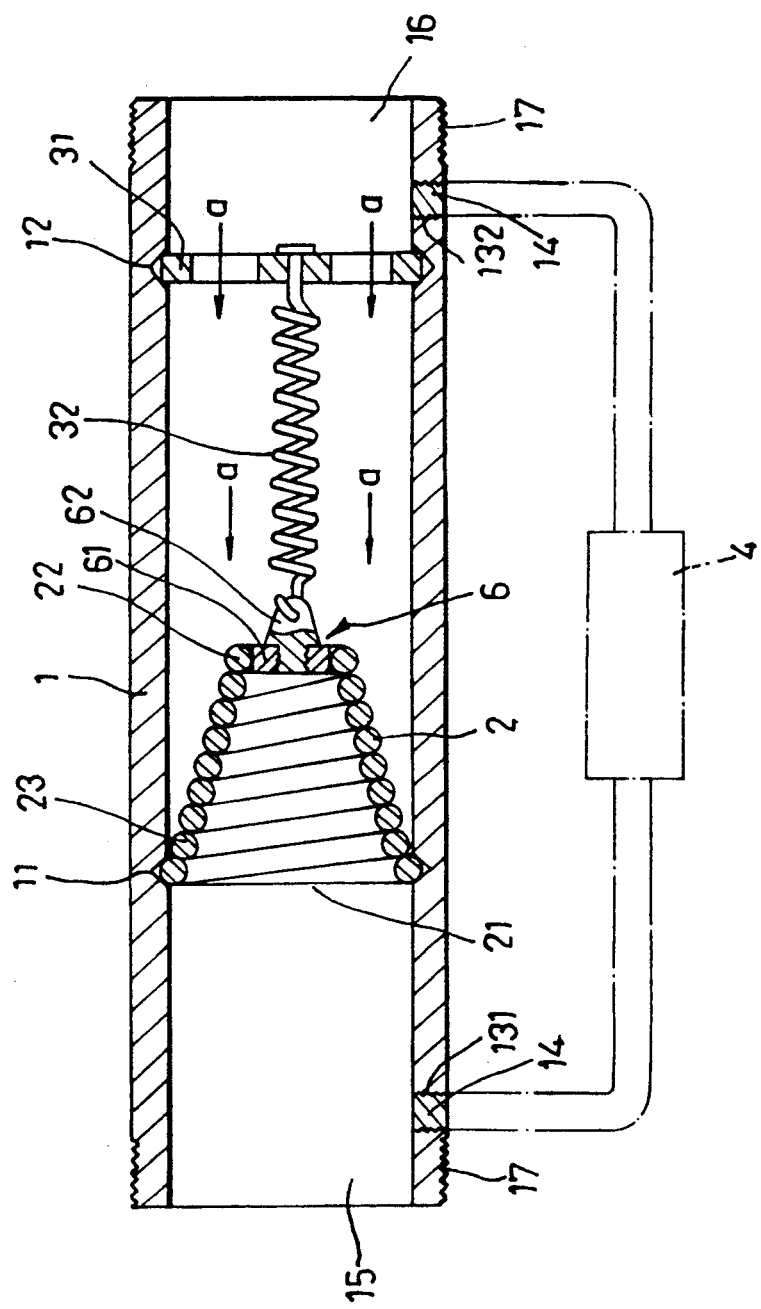
FIG. 4 is a sectional schematic view of a first preferred embodiment of a control valve of this invention.

FIG. 4 shows a sectional view of a first preferred embodiment of a control valve of this invention. The control valve includes a tubular member 1 which has a first open end 15 and a second open end 16. A truncated conical helix spring 2 has a truncated tapered open end 22 and a diverging open end 21 opposed to the truncated tapered open end 22. The truncated tapered open end 22 has a plug member 6 fixed therein in order to close the truncated tapered end 22. The plug member 6 includes a screw nut 61 connected securely to the truncated tapered open end 22 and a screw rod 62 threaded to the screw nut 61. A truncated cone-shaped chamber is thus confined by the helix spring 2. The helix spring 2 is formed of a plurality of turns 23 which are wound in a watertight manner. The diverging open end 21 of the helix spring 2 is positioned in a first annular groove 11 which is formed in the internal wall surface of the tubular member 1 adjacent to the first open end 15 of the tubular member 1.

Figure 5:
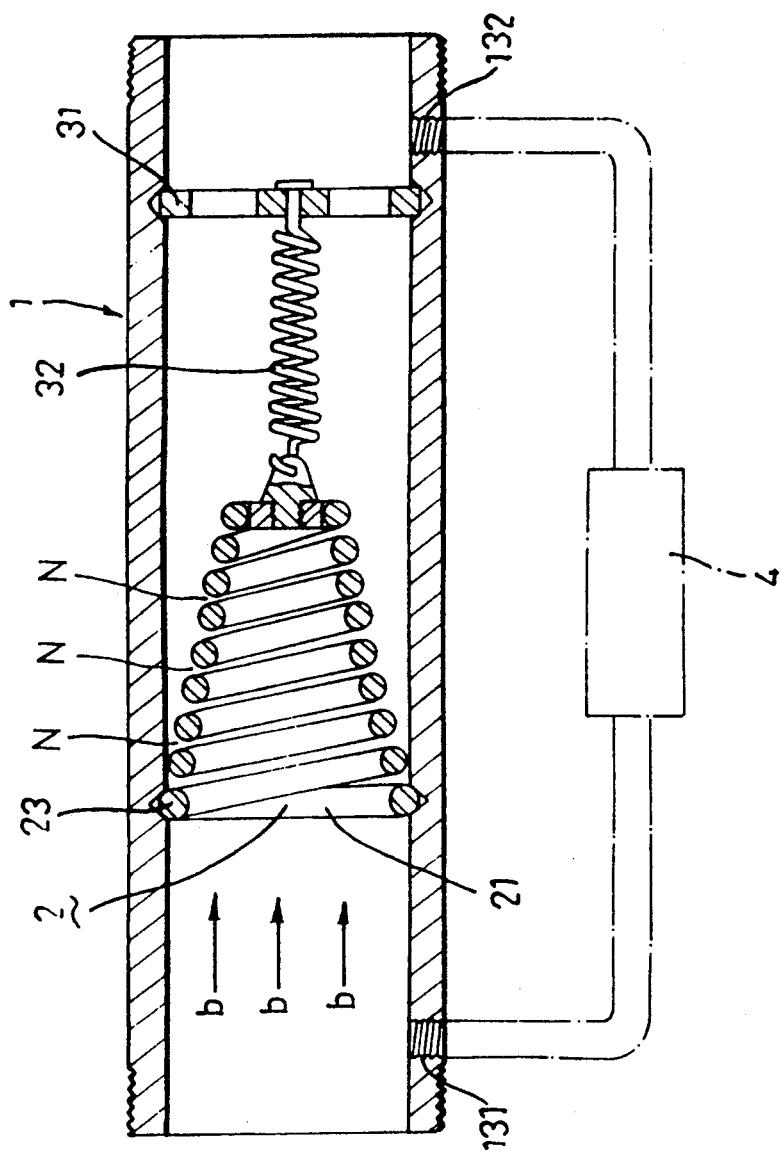
FIG. 5 is a sectional schematic view illustrating the first preferred embodiment of the control valve of this invention in an operative position.

The tubular member 1 has a perforated disc 31 coaxially fixed in a second annular groove 12 which is formed in the internal wall surface of the tubular member 1 adjacent to the second open end 16. A positioning spring 32 interconnects axially the screw rod 62 of the plug member 6 and the center of the perforated disc 31 under tension. Since the pulling force of the positioning spring 32 is smaller than that of the helix spring 2, the turns 23 of the helix spring 2 are in firm contact with one another in a watertight manner when in a normal position as described hereinbefore. The helix spring 2 extends to an open position under a predetermined axial tension force, thereby forming a plurality of clearances (N) among the turns 23, as best illustrated in FIG. 5. The amount of predetermined axial tension force depends upon the material of the helix spring 2 and/or the diameter of the turns 23.

When the control valve of the present invention is connected to a pipe line (not shown) of a fluid system, the tubular member 1 is mounted to the pipe line so that the fluid enters the tubular member 1 from the first open end 15 in a direction (b), as illustrated in FIG. 5. The first and second open ends, 15 and 16, are provided with external threads 17 or other connection means, such as ANSI/JIS/DIN flanges in order to threadedly engage the pipe line of the fluid system. When the fluid pressure exceeds the predetermined axial tension force, the truncated conical helix spring 2 will extend to allow the fluid to pass through the clearances (N) between the turns 23 of the helix spring 2. The width of the each clearance (N) is mathematically related to the fluid pressure. When the flow rate of the fluid is increased, the width of the each clearance (N) is increased. When the flow rate of the fluid is decreased, the width of the each clearance (N) is decreased. Therefore, the control valve of the present invention can regulate the flow rate automatically and serve as a self-regulator. If the fluid flows from the second open end 16 of the tubular member 1 in a direction (a), as shown in FIG. 4, or if the fluid pressure at the second open end 16 is greater than that at the first open end 15, the helix spring 2 will be pushed to the normal position, thereby preventing the fluid at the right side of the helix spring 2 from flowing to the left side of the helix spring 2. Therefore, the control valve of this invention can also serve as a check valve.

The tubular member 1 has a first connecting outlet port 131 formed between the first open end 15 of the tubular member 1 and the diverging open end 21 of the helix spring 2. A second connecting outlet port 132 is formed between the second open end 16 of the tubular member 1 and the perforated disc 31. The first and second connecting outlet ports, 131 and 132, which are internally threaded, may be closed by two threaded stops 14, as best illustrated in FIG. 4. After the threaded stops 14 have been removed, the first and second connecting outlet ports, 131 and 132, may be connected respectively to two open ends of a transducer 4 in order to determine a differential pressure between the first and second connecting outlet ports, 131 and 132, of the tubular member 1. Further, the transducer 4 can convert the differential pressure between the first and second connecting outlet ports, 131 and 132, into a flow rate readout. Thus, the control valve of this invention can be used as a differential pressure type variable volume meter.

Note that the structure and the assembly of the control valve of this invention are very simple. In addition, the triple functional control valve of this invention can serve as a check valve, a self-regulator and/or a flowmeter.

Figure 6:
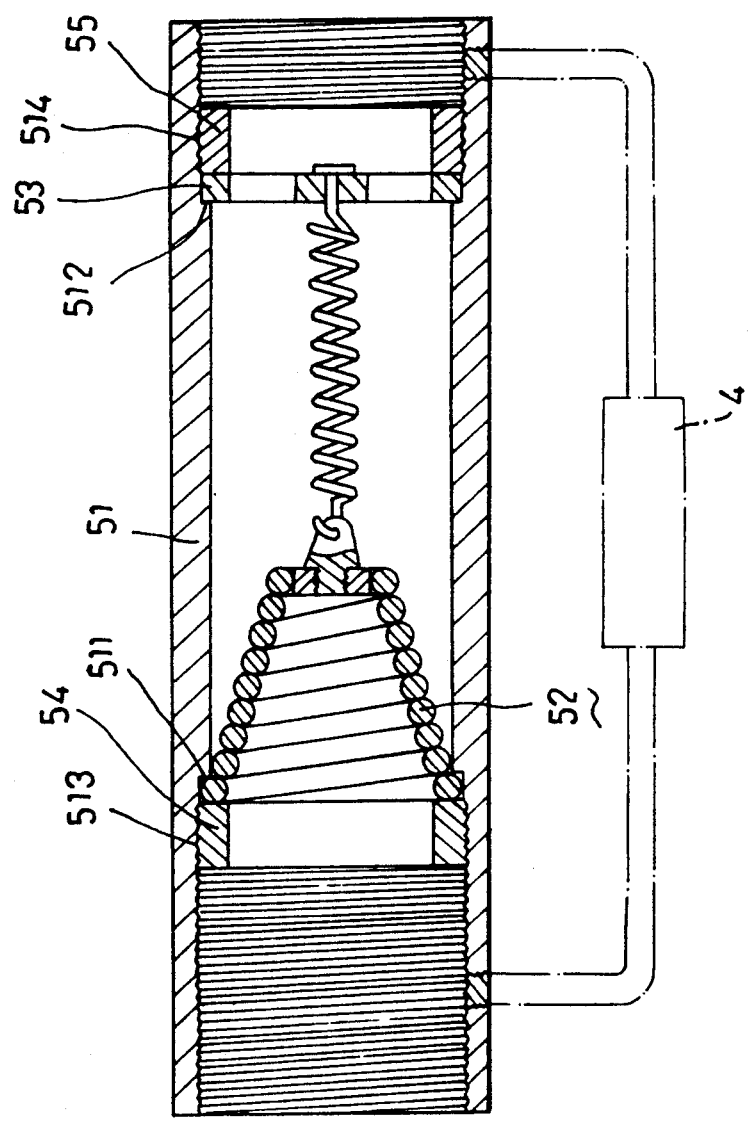
FIG. 6 is a sectional schematic view of a second preferred embodiment of a control valve of this invention.

FIG. 6 shows a sectional schematic view of a second preferred embodiment of the control valve of this invention. In this embodiment, the structure of the control valve is similar to that of the first embodiment except that two internal thread sections, 513 and 514, are respectively formed at two open ends of the tubular member 51 thereof and two shoulders, 511 and 512, are respectively formed at the inner ends of the internal thread sections 513 and 514. The diverging open end 521 of the truncated conical helix spring 52 and the perforated disc 53 respectively abut the shoulders 511 and 512, and are positioned respectively in the tubular member 51 by means of two external threaded nuts, 54 and 55, as best illustrated in FIG. 6.

With this invention thus explained, it is apparent that numerous modifications and variations can be made without departing from the scope and spirit of this invention. It is therefore intended that this invention be limited only as indicated in the appended claims.

We claim:

1. A control valve comprising:

a tubular member having a first open end, a second open end and a perforated disc fixed coaxially adjacent to said second open end;

a truncated conical helix spring having a truncated tapered open end and a diverging open end opposed to said truncated tapered open end, said truncated tapered open end having a plug member fixed therein in order to close said truncated tapered open end; and a positioning spring interconnecting axially said plug member and the center of said perforated disc under tension, the pulling force of said positioning spring being smaller than that of said helix spring, said helix spring confining a truncated cone-shaped chamber and being formed of a plurality of turns which are wound in a watertight manner, said truncated conical helix spring extending and forming a plurality of clearances among said turns under a predetermined axial tension force, said helix spring being received in said tubular member with said diverging open end of said helix spring being fixed adjacent to said first open end of said tubular member.

2. A control valve as claimed in claim 1, wherein said tubular member has a first connecting outlet port formed between said first open end of said tubular member and said diverging open end of said helix spring, and further has a second connecting outlet port formed between said second open end of said tubular member and said truncated tapered open end of said helix spring, said control valve further comprising a transducer which has two open ends connected respectively to said first and second connecting outlet ports of said tubular member in order to determine a flow rate in said tubular member.

3. A control valve as claimed in claim 1, wherein said tubular member has a first connecting outlet port formed between said first open end of said tubular member and said diverging open end of said helix spring, and further has a second connecting outlet port formed between said second open end of said tubular member and said disc, said control valve further comprising a transducer which has two open ends connected respectively to said first and second connecting outlet ports of said tubular member in order to determine a flow rate in said tubular member.

* * * * *